United States Patent [19]

West et al.

[11] 4,290,516
[45] Sep. 22, 1981

[54] TORQUE LIMITER

[75] Inventors: Jeffery L. West, Winchester; Randy Berry, Sudbury, both of Mass.

[73] Assignee: Foster-Miller Associates, Inc., Waltham, Mass.

[21] Appl. No.: 46,448

[22] Filed: Jun. 7, 1979

[51] Int. Cl.³ .............................................. F16D 43/20
[52] U.S. Cl. .................................. 192/56 L; 81/473; 81/475
[58] Field of Search .......................... 192/56 R, 56 L; 81/52.4 R, 52.4 A, 467, 473, 475; 64/29

[56] References Cited

U.S. PATENT DOCUMENTS

| 1,443,026 | 1/1923 | Lee | 64/29 |
|---|---|---|---|
| 1,953,430 | 4/1934 | Parre | 64/29 |
| 2,202,497 | 5/1940 | Landahl | 192/56 L |
| 2,425,736 | 8/1947 | Hall | 192/56 L |
| 2,570,585 | 10/1951 | Murphy | 192/56 L |
| 2,713,406 | 7/1955 | Babaian | 192/56 L |
| 2,753,030 | 7/1956 | Wight | 192/56 L |
| 2,852,972 | 9/1958 | Larson | 64/29 X |
| 3,132,730 | 5/1964 | Dahlstrand et al. | 192/56 L |
| 3,561,576 | 2/1971 | Lutz | 192/56 L |

FOREIGN PATENT DOCUMENTS

| 40852 | 5/1958 | Poland | 64/29 |
|---|---|---|---|
| 321702 | 11/1929 | United Kingdom | 192/56 L |

*Primary Examiner*—Allan D. Herrmann
*Attorney, Agent, or Firm*—Herbert L. Bello

[57] ABSTRACT

A torque limiter with a rotatable housing having a series of dowels arranged annularly about an interior surface thereof and a sleeve having a pair of arms with a roller at the tip of each arm. The rollers are mounted to engage pairs of adjacent dowels selectively for transmitting torque from the housing to the sleeve. A lock-out mechanism disengages the rollers and dowels when a preset torque limit setting is exceeded by torsional resistance of the sleeve relative to the housing.

10 Claims, 2 Drawing Figures

TORQUE LIMITER

BACKGROUND OF THE INVENTION

1. Field of the Invention

The present invention relates to torque applying devices and, more particularly, is directed to devices for applying a preset torque.

2. Description of the Prior Art

In the mining industry, a bolter is used to drill holes in the roof of a mine and to install roof bolts therein. The bolter includes a wrench that is configured to engage the head of a roof bolt. The wrench is positioned manually on the drill chuck of the bolter and the bolt head is engaged by the wrench. The boom of the bolter is raised and the bolt is thrust against the roof of the mine until the head seats against its bearing plate. The chuck is rotated and the wrench transmits rotational power to the bolt to tighten it in its expansion shell. During tightening, some thrust is maintained on the bolt. The friction associated with the thrust force and the variability of the input torque combine to provide an essentially indeterminate level of torque which is finally applied to the bolt. A need exists for a device which will apply a preset level of torque to bolts.

SUMMARY OF THE INVENTION

An object of the present invention is to provide a device for applying a predetermined torque level.

Another object of the invention is to provide a device for applying a predetermined torque level to roof bolts.

Yet another object of the invention is to provide a device with a lock-out mechanism for applying a predetermined torque level to roof bolts.

A further object of the invention is to provide a device for applying a preset torque to a roof bolt while thrust forces are isolated from the roof bolt and torque measuring mechanism during tightening.

A still further object of the invention is to provide a device for applying a predetermined torque level to a roof bolt, torque being removed from the roof bolt by a lock-out mechanism when the predetermined torque level is obtained. The device is characterized by a driven housing that drivingly engages a sleeve which applies torque to the roof bolt. One end of the housing is configured to be engaged by a driving mechanism and the end of the sleeve is adapted to receive a roof bolt head. The housing of the device includes a series of evenly spaced pins disposed annularly about an interior surface thereof. The sleeve includes a pair of movable arms, each arm having a roller at one end. The rollers are arranged to rest between adjacent pins and drivingly engage the housing and sleeve. The arms are spring loaded in such a manner that the rollers and pins disengage when a preset torque level is applied to the roof bolt. When the preset torque level is reached, the arms are cammed inwardly by the pins and then forced further inwardly by the lock-out mechanism, whereby the rollers and pins remain fully disengaged and the torsional connection to the roof bolt is fully released.

Other objects of the present invention will in part be obvious and will in part appear hereinafter.

The invention accordingly comprises the apparatuses, processes and products, together with their parts, steps, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
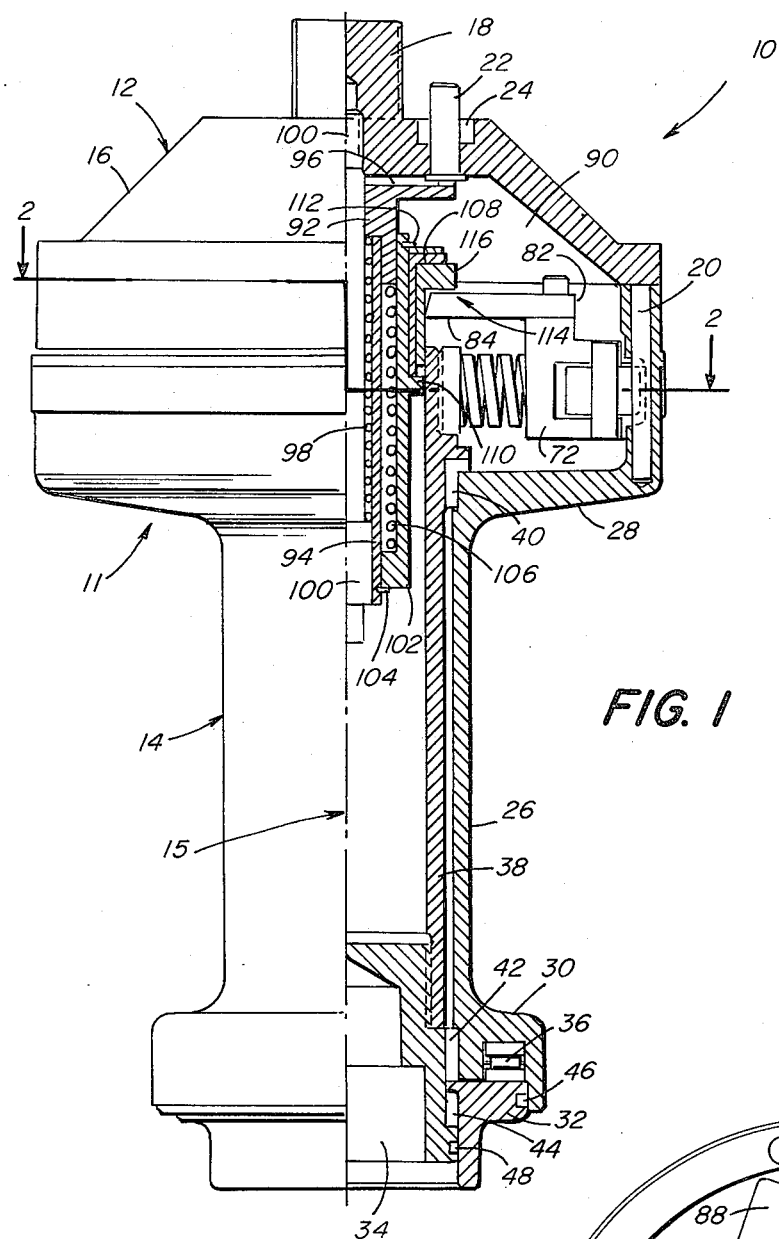
FIG. 1 is a side elevation, partly in section, of a torque limiting device embodying the invention.
Figure 2:
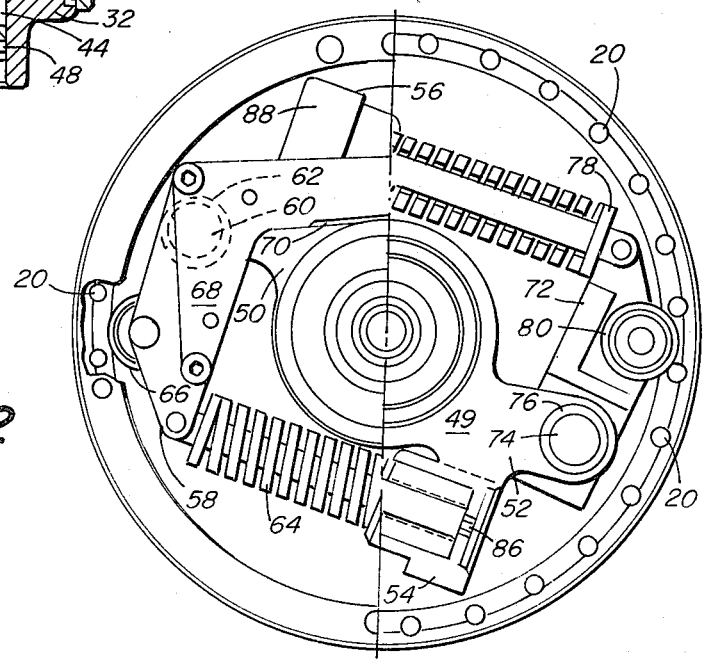
FIG. 2 is a sectional view taken along the lines 2—2 of FIG. 1.

In the following description, a torque limiter 10 embodying the present invention and shown in FIGS. 1 and 2 is described in the context of a roof bolt application. It is to be understood that the torque limiter is suited for a variety of situations which require application of a predetermined torque level. Torquer limiter 10 is particularly adapted to utilize the rotational power and thrust available from a conventional bolter (not shown) for installation of roof bolts in a coal mine. The bolter is a machine for drilling holes in the roof of a mine into which roof bolts are inserted and tightened to a predetermined level. Compressive forces applied to the roof strata are governed by the tension in the roof bolts. The roof strata are prevented from sliding over each other by the roof bolts and form a self-supporting beam. As hereinafter described, torque limiter 10 is configured to withstand the thrust of the bolter while torquing of the roof bolt, torque limiter 10 isolates the bolt head and torque limiting mechanism from the thrust.

Referring now to the drawings, it will be seen that torque limiter 10 comprises a rotatable housing 11 having a head 12 and a body 14, and a torque mechanism 15 having a driven internal sleeve 38. Head 12 includes a hollow conical frame 16 with an extending shaft 18 that is configured to be driven by a bolter (not shown). Shaft 18 is disposed along the centerline of torque limiter. An actuator plug 22 is slidably received within an opening 24 formed in frame 16 adjacent shaft 18, an O-ring is fitted about the actuator plug. Body 14 includes a cylindrical housing 26 having an enlarged base 28 at one end and an enlarged neck 30 at an opposite end. The diameter of base 28 is somewhat larger than the diameter of neck 30. Base 28 mates with frame 16. A series of equally spaced pins 20, for example dowels, are mounted at an interior surface of base 28 about the centerline of torque limiter 10.

A hollow pad 32, which is formed with a socket 34 that is configured to receive the head of a roof bolt, is mounted to body 14 at neck 30. Thrust isolation is provided by a roller thrust bearing 36 that is disposed between pad 32 and neck 30. Socket 34 is mounted to drive sleeve 38 which is received in sleeve bearings 40 and 42. Bearing 42 is disposed between an interior surface of neck 30 and an exterior surface of socket 34, and a bushing 44 is positioned between the exterior surface of socket 34 and an interior surface of pad 32. O-ring seals 46 and 48 are employed to prevent penetration of dirt, water and other foreign material into torque limiter 10.

As previously indicated, thrust isolation is provided by roller thrust bearing 36 which is disposed between adjacent surfaces of neck 30 and pad 32. When the head of the roof bolt is received within socket 34, pad 32 bears directly on a bearing plate associated with the roof bolt. In consequence, the roof bolt is not subjected to any thrust as it draws itself against the bearing plate during final torquing. When the roof bolt has been thrust up to the roof strata, torque limiter 10 is effectively clamped between the chuck of the bolter and the mine roof. The head of the bolt is essentially free to float longitudinally in socket 34, although the shapes of the socket and bolt head prevent relative rotational movement therebetween. Torquing of the roof bolt is accomplished by rotating socket 34. As shaft 18 is turned by the bolter, a predetermined torque level is transmitted to socket 34 by means of a novel drive and lock-out mechanism now to be described.

Socket 34 is connected to one end of drive sleeve 38 within neck 30. A mount 49 is connected to the other end of drive sleeve 38 within base 28. Mount 49 includes a pair of extending legs 50, 52 and a pair of extending feet 54, 56. Legs 50 and 52 are equidistant from the centerline of torque limiter 10 and are diametrically opposite each other. Similarly, feet 54 and 56 are equidistant from the centerline of torque limiter 10 and are diametrically opposite each other. One end of an arm 58 is pivotally mounted to leg 50 by means of a pin 60 and a roller bearing 62. The opposite end of arm 58 is pivotally mounted to one end of a spring loaded assembly 64, the other end of the spring loaded assembly being connected to foot 54. A roller 66 is mounted to arm 58 adjacent spring loaded assembly 64 for engagement and disengagement with dowels 20. A substantially L-shaped member 68 having an extending finger 70 is mounted to arm 58, member 68 and arm 58 being fixed against relative movement. In an identical manner, one end of an arm 72 is pivotally mounted to leg 52 by means of a pin 74 and a roller bearing 76. The opposite end of arm 72 is pivotally mounted to one end of a spring loaded assembly 78, the other end of the spring loaded assembly being connected to foot 56. A roller 80 is mounted to arm 72 adjacent spring loaded assembly 78 for engagement and disengagement with dowels 20. A substantially L-shaped member 82 having an extending finger 84 is mounted to arm 72, member 82 and arm 72 being fixed against relative movement. Force of spring loaded assemblies 64 and 78 is controlled by adjustment of movable devices 86 and 88, respectively, for example hex socket plugs. In the illustrated embodiment, roller 66 is shown disengaged from dowels 20 and roller 80 is shown in engagement with adjacent dowels 20. In operation of torque limiter 10, both rollers 66 and 80 either are in engagement with or disengaged from adjacent dowels 20, the illustrated embodiment merely showing the engaged and disengaged positions for a fuller understanding of the invention. Rollers 66 and 80 are held in the disengaged position by means of a lock-out mechanism generally denoted by the reference character 90 in FIG. 1.

Lock-out mechanism 90 includes an actuator 92 with a cylindrical body 94 and an enlarged head 96. A return spring 98 is constrained between an inner surface of cylindrical body 94 and the head of a bolt 100 which is threaded into shaft 18. Head 96 is pressed against actuator plug 22 by spring 98. A sleeve 102 is fitted over cylindrical body 94 and held against relative movement by a retaining ring 104. A cocking spring 106 is constrained between cylindrical body 94 and sleeve 102. A bushing 108, which is fitted about sleeve 102, is captively held in place between a shoulder 110 on sleeve 102 and a lock ring 112. A lock-out ring 114 having an enlarged head 116 is mounted about bushing 108. Cocking spring 106 presses head 116 of lock-out ring 114 against fingers 70 and 84 when plunger 22 is depressed. As best shown in FIG. 1, the side of enlarged head 116 and the innermost side of fingers 70 and 84 are tapered inwardly towards one another to permit lock-out ring 114 to move into engagement with the fingers in order to fully disengage rollers 66, 80 and dowels 20 when the edges of the fingers have been moved out beyond the edge of the enlarged head.

In the illustrated embodiment, by way of example, torque limiter 10 is composed of steel and is approximately twelve inches long with a one and one-eighth inch square drive lug (shaft 18) on one end and one and one-eighth square hole on the opposite end (socket 34). Torque limiter 10 is positioned on the drill chuck of the bolter with shaft 18 engaged in the mating hole of the chuck. The head of the roof bolt is engaged by socket 34 and the boom of the bolter is raised. Raising of the boom thrusts the bolt against the roof strata until the bolt head seats against its bearing plate. Torque limiter 10 is effectively clamped between the chuck of the bolter and the roof strata. The head of the roof bolt is essentially free to float longitudinally in socket 34, even though the square head of the bolt is in engagement with the square hole of the socket. Clamping of torque limiter 10 pushes actuator plug 22 inwardly, whereby actuator 92 is moved towards neck 30.

As the chuck of the bolter turns shaft 18 and body 12, socket 34 is rotated by the engagement of rollers 66, 80 and dowels 20. Spring loaded assembly 64 presses roller 66 into driving engagement with a pair of adjacent dowels 20 and spring loaded assembly 78 presses roller 80 into driving engagement with a pair of adjacent dowels 20. Mount 49 rotates as rollers 66 and 80 are carried in a circular path by dowels 20. Drive sleeve 38 is rotated by mount 49 and socket 34 is rotated by the drive sleeve. That is, as body 12 is rotated, torque is transmitted through dowels 20; rollers 66, 80; arms 58, 72; mount 50; drive sleeve 38; and socket 34 to the bolt head.

As the torsional resistance of the roof bolt increases, the forces between rollers 66, 80 and dowels 20 increase proportionally and tend to drive the rollers inwardly. At some point, the force exerted by spring loaded assemblies 64 and 78 just balances the forces induced on arms 58 and 72 about their pivots by the torque being transmitted. The force of spring loaded assemblies 64 and 78 establishes the predetermined torque level to be applied to the roof bolt. As the torsional resistance of the roof bolt increases, spring loaded assemblies 64 and 78 can no longer overcome the forces induced on arms 58 and 72 by the transmitted torque, rollers 66 and 80 are driven inwardly. As rollers 66 and 80 move inwardly, the moment arm of the forces increases about arm pivots 60 and 74 because of the geometry. Hence, the torsional resistance drops rapidly as arms 58 and 72 swing inwardly. When rollers 66 and 80 ride over dowels 20, arms 58 and 72 reach a point at which the normal force between rollers 66, 80 and dowels 20 is reduced to approximately one-tenth the force level at which release began. Thus, the torsional connection to the roof bolt is released at the torque level determined by the force of spring loaded assemblies 64 and 78.

Arms 58 and 72 are driven inwardly as the torsional set point is reached and the tips of fingers 70 and 84 move radially outward until they pass beyond the radius of tapered edge 116 of lock-out ring 114. Cocking spring 106 forces the tapered outside surface of lock-out ring 114 under the tips of fingers 70 and 84. The force conditions on arms 58, 72, the spring load on lock-out ring 114 and the taper of the ring surface are selected to allow the spring load to force the lock-out ring all the way under the fingers. In the preferred embodiment, the taper on lock-out ring 114 and the taper on fingers 70, 84 is five degrees. Thus, lock-out ring 114 wedges arms 58, 72 inward a few thousandths of an inch beyond the point reached by the camming action of dowels 20. Hence, rollers 66, 80 are fully released and no mechanical contact occurs again between the rollers and dowel 20 until torque limiter 10 is recycled. Accordingly, torque limiter 10 can be rotated indefinitely once release has occurred without damage, significant heat build-up, noise or any effect on the torque of the bolt.

Lowering of the boom after installation of the roof bolt automatically removes the thrust from actuator plug 22. Return spring 98 is now free to return the actuator 92 towards head 12. Because of retaining ring 104 on the actuator sleeve, however, the outer sleeve 102 and lock-out ring 114 are drawn back toward the head 12 also. Thus, lock-out ring 114 is forced out from under fingers 70, 82, and rollers 66, 80 are free to snap back into engagement with dowels 20 and are ready for another cycle. The lock-out mechanism utilizes the axial thrust on torque limiter 10 to provide fully automatic lock-out and resetting of the torque limiter for each cycle of operation.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A device for applying a predetermined torque level to an object, said device comprising:
   (a) a rotatable housing configured to be rotated by a driver, said rotatable housing having a series of evenly spaced dowel means disposed in a circular path about an interior surface thereof;
   (b) torque means mounted within said housing, said torque means including driven member means having rollers configured to engage and to disengage adjacent ones of said dowel means, said torque means rotatable with said housing when said rollers and said dowel means are engaged, said driven member means including means for engaging the object to which the predetermined torque level is to be applied; and
   (c) bias means mounted in said housing, said bias means urging said rollers and said dowel means into engagement with a predetermined force, said dowel means and said rollers disengaged when the torsional resistance on said driven member means exceeds said predetermined force.

2. The device as claimed in claim 1 including lock-out means selectively engaging said driven means, said lock-out means positively disengaging said dowel means and said rollers when the torsional resistance on said drive member means exceeds said predetermined force.

3. A device for applying thrust and a predetermined torque level to an object, said device comprising:
   (a) a housing configured to have thrust applied thereto and to be rotated by a driver, said housing having a series of evenly spaced drive member means disposed in a circular path about an interior surface, said housing rotatable about an axis when rotated by said driver, said drive member means orbiting about said axis in said circular path when said housing is rotated by said driver;
   (b) torque means mounted in said housing, said torque means including driven member means mounted for engagement and disengagement with said drive member means, said torque means rotatable with said housing when said driven member means is in engagement with said drive member means and said drive member means is rotating;
   (c) first means operatively connected to said driven member means for engaging the object to which the thrust and the predetermined torque is to be applied;
   (d) thrust isolation means mounted to said housing for isolating said first means from thrust applied to said housing;
   (e) bias means mounted in said housing, said bias means urging said driven member means and said drive member means into engagement with a predetermined force, said drive member means and said driven member means disengaged when the torsional resistance on said driven member means exceeds said predetermined force; and
   (f) lock-out means selectively engaging said driven member means, said lock-out means disengaging said drive member means and said driven member means when the torsional resistance on said driven member means exceeds said predetermined force.

4. The device as claimed in claim 3 wherein said driven member means includes a mount and a pair of arms, said arms carried on said mount, each of said arms having a roller which engages and disengages said drive member means.

5. A device for applying a predetermined torque level to an object, said device comprising:
   (a) a rotatable housing configured to be rotated by a driver, said rotatable housing having a series of evenly spaced drive member means disposed in a circular path about an interior surface;
   (b) torque means mounted in said housing, said torque means including driven member means mounted for engagement and disengagement with said drive member means, said driven member means rotating when in engagement with said drive member means and said drive member means is rotating;
   (c) first means operatively connected to said driven member means for engaging the object to which the predetermined torque is to be applied;
   (d) thrust isolation means mounted to said housing about said first means for isolating said first means from thrust applied to said housing;
   (e) bias means mounted in said housing, said bias means urging said driven member means and said drive member means into engagement with a predetermined force, said drive member means and said driven member means disengaged when the torsional resistance on said driven member means exceeds said predetermined force; and
   (f) lock-out means selectively engaging said driven member means, said lock-out means disengaging said drive member means and said driven member means when the torsional resistance on said driven member means exceeds said predetermined force;
   (g) said driven member means including a mount, a pair of arms and a series of evenly spaced pins disposed in a circular path about an interior surface of said housing, said arms carried on said mount, each of said arms having a roller which engages and disengages said drive member means, each said roller diametrically and equidistantly disposed from a centerline of said device, each said roller contacting adjacent ones of said pins when said drive member means and said driven member means are engaged.

6. The device as claimed in claim 5 wherein said device includes actuator means mounted to said housing and constrained for movement between first and second positions, said actuator means in said second position when thrust is applied to said device, said actuator means in said first position when thrust is removed from said device, said actuator means moving said drive member means and said driven member means from disengagement into engagement when thrust is removed from said device.

7. A device for applying a predetermined torque level to an object, said device comprising:
 (a) a rotatable housing configured to be rotated by a driver, said rotatable housing having a series of evenly spaced drive member means disposed in a circular path;
 (b) torque means mounted in said housing, said torque means including driven member means configured to engage and to disengage adjacent ones of said drive member means, said driven member means having means for engaging the object to which the predetermined torque level is to be applied;
 (c) bias means mounted in said housing, said bias means urging said driven member means and said drive member means into engagement with a predetermined force, said drive member means and said driven member means disengaged when the torsional resistance on said driven member means exceeds said predetermined force; and
 (d) lock-out means selectively engaging said driven means, said lock-out means disengaging said drive member means and said driven member means when the torsional resistance on said driven member means exceeds said predetermined force;
 (e) said driven member means including a mount and a pair of arms, said arms carried on said mount, each of said arms having a roller which engages and disengages said drive member means, and wherein said drive member means includes a series of evenly spaced pins disposed in a circular path about an interior surface of said housing, each said roller diametrically and equidistantly disposed from a centerline of said device, each said roller contacting adjacent ones of said pins when said drive member means and said driven member means are engaged.

8. A device for applying a predetermined torque level to an object, said device comprising:
 (a) a rotatable housing configured to be rotated by a driver, said rotatable housing having a series of evenly spaced drive member means disposed in a circular path about an interior surface;
 (b) torque means mounted in said housing, said torque means including driven member means mounted for engagement and disengagement with said drive member means, said driven member means rotating when in engagement with said drive member means and said drive member means is rotating;
 (c) first means operatively connected to said driven member means for engaging the object to which the predetermined torque is to be applied;
 (d) thrust isolation means mounted to said housing about said first means for isolating said first means from thrust applied to said housing;
 (e) bias means mounted in said housing, said bias means urging said driven member means and said drive member means into engagement with a predetermined force, said drive member means and said driven member means disengaged when the torsional resistance on said driven member means exceeds said predetermined force; and
 (f) lock-out means selectively engaging said driven member means, said lock-out means disengaging said drive member means and said driven member means when the torsional resistance on said driven member means exceeds said predetermined force;
 (g) said driven member means including a mount having first and second legs and first and second feet, said mount concentric about a longitudinal axis of the device, said legs diametrically opposite one another and equidistant from said longitudinal axis, said feet diametrically opposite one another and equidistant from said longitudinal axis, a first arm pivotally mounted to said first leg, a second arm pivotally mounted to said second leg, said bias means including first and second spring means, said first spring means connected to said first arm and said second foot, said second spring means connected to said second arm and said first foot, a first roller mounted to said first arm for engagement with said drive member means, a second roller mounted to said second arm for engagement with said drive member means, the predetermined torque level determined by tension on said first and second spring means.

9. The device as claimed in claim 8 wherein said driven member means includes first and second finger means, said first finger means mounted to said first arm, said second finger means mounted to said second arm, said first and second finger means engaging said lock-out means for disengaging said drive member means and said first and second rollers.

10. The device as claimed in claim 9 wherein said lock-out means includes a lock-out ring with a tapered face, said first and second fingers having a tapered face, said lock-out ring tapered face and said first and second fingers tapered face in mating alignment when said drive member means and said first and second rollers are disengaged.

* * * * *